United States Patent Office 3,278,471
Patented Oct. 11, 1966

3,278,471
ROOFING COMPOSITIONS COMPRISING POLYISO-
BUTYLENE, POLYETHYLENE AND PIGMENT
Charles T. Rairdon, Somerville, N.J., assignor to Johns-
Manville Corporation, New York, N.Y., a corporation
of New York
No Drawing. Filed Mar. 26, 1962, Ser. No. 182,632
21 Claims. (Cl. 260—23)

This invention relates to a new composition of matter containing polyisobutylene, which composition is capable of being formed into films possessed of excellent exterior weathering characteristics. Specifically, the invention relates to a high molecular weight polyisobutylene-containing composition which has been reinforced and highly extended with stable fillers. The films from this stock have outstanding resistance to ultraviolet light, oxygen and ozone, and may be used for inexpensive roofing, flashing, waterproofing and related applications.

FIELD OF INVENTION

The roofing industry and related fields have achieved remarkable growth in the past few decades with one of the most prominent industrial applications having been the use of "built-up" roofing. This practice employs the use of layers of rolled saturated papers, such as asphalt saturated asbestos, overlapped and bonded together by mopped asphalt. The number of layers and extent of overlapping is dependent on the desired thickness.

While such a roofing material has met with marked commercial success, continued efforts have nevertheless been made to improve upon the system and particularly with regard to finding new and useful materials. Prominent among the many materials tried have been natural and synthetic resinous films. However, either because of the economics or because of a lack of necessary physical properties, almost without exception none of these materials has been successful in replacing the asphalt impregnated paper.

Among the many properties desirable for roofing or similar weathering application are the following:

(1) Easy and economical processability on standard equipment;
(2) Low material cost so as to be competitive with existing materials;
(3) Easy application to roofing decks without special adhesives and the like;
(4) Ease of application under high and low temperature conditions;
(5) Good weatherability, i.e., resistance to sunlight, ozone, water and water vapor;
(6) Pliable and conformable to irregular shapes;
(7) Capable of withstanding normal roof traffic without damage;
(8) Paintable;
(9) Good shelf life; and
(10) Surface gloss or finish particularly for white or light colored materials.

In the early development of plastic compositions for protective purposes, certain observations had been made. Unfilled polymers in general were subject to degradation by ultraviolet light and oxidation; exposed films would darken and become brittle on prolonged outdoor exposure. The saturated polymers, on the other hand, tended to show better resistance to oxidation or ozonization than those polymers containing curable double bonds; but even the saturated polymers showed a marked tendency to degrade due to ultraviolet light-catalyzed oxidation. Certain ultraviolet light absorbing or screening materials could be incorporated in the plastic to help deter the effects of weathering on such products, but at the expense of increasing the cost of the final product.

Certain disadvantages have been found with the various resinous films and may be illustrated by the poor shelf life of neoprene, the need for special adhesives for butyl rubbers and the cracking of asphalt materials at low temperatures.

It was therefore in this regard that with the first synthesis in the early 30's of polymers of isobutylene, the formulators were quick to recognize the significance of the chief characteristics of the new material as similar to rubber with the additional advantage of being resistant to attack by a considerable number of chemical substances. These polymers were not only possessed of good elasticity, plasticity and cold flow, but additionally, even after extended periods of submersion in acid, alkaline or salt waters, retained their properties and did not swell or rot. In view of these findings, it was a natural result that the material was incorporated in various forms of building construction and particularly as a protection in situations where waterproofing or chemical resistance was desired.

However, the polyisobutylene compositions, while possessed of certain highly desirable properties, were also particularly liable to decomposition on exposure to radiation containing ultraviolet light. Thus, the art, while aware of many beneficial properties of polyisobutylene and therefore equipped with a sound basis from which to work, had to seek means of overcoming its deficiencies.

The compounders also became concerned with the processing and physical properties of the stock. In order to make the material commercially attractive, the product costs had to be reduced by proper choice of extenders and fillers without sacrificing physical properties, or deterring the processing properties of the compound. It was found that certain fillers and reinforcing media contributed to good processing and certain lubricants and processing aids contributed to the good handling characteristics of the stock, but that the compounding ingredients had to be selected so that they did not detract from the weather resistance or low temperature flexibility of the film.

Various linear olefinic polymers and interpolymers were prepared from isobutylene modified in order to capitalize on these properties, and illustrative of the early realization of these beneficial properties are U.S. Patent Nos. 2,316,706 and 2,393,321.

An inasmuch as these types of compositions had demonstrated certain protective properties, the compositions had earlier been modified and prepared as a film for various exterior weathering applications wherein resistance to the effects of heat, cold, moisture and the like play an important role. One such application may be represented by British Patent No. 811,842.

Another application relying on the good resistance to corrosive materials may be illustrated by U.S. Patent No. 2,426,820.

However, while the significance of polyisobutylene had been recognized, it, nevertheless, has never achieved any extended usage in the building trade, since the economics of building construction have compelled the use of a less expensive material, e.g., asphalt saturated paper.

Moreover, it has been determined that a white, highly reflective film is highly desirable as a roofing material because of the lower roof temperature during long periods of sun exposure, thus giving the building occupants greater comfort under these circumstances. In addition, lower air conditioning loads would be placed on the equipment if the building has a highly reflective roofing film.

Thus, while cognizant for many years of the useful physical properties of synthetic materials and particularly polyisobutylene for weathering purposes, the art has failed to provide an economical and efficient composition to satisfy the above-mentioned properties.

By the instant invention a new polyisobutylene composition has been discovered wherein the ingredients are combined in specific relations to produce a highly effective, economical and competitive roofing material in accordance with the above criteria and satisfy the long felt need for improved roofing and related structures.

A significant feature of the instant invention resides in the discovery that while certain additives have been heretofore recognized as advantageously combined with polyisobutylene, it has not been possible to provide an economically sound composition, and this disadvantage may now be overcome by the addition of new ingredients to a polyisobutylene stock and the combination of all the ingredients in certain specific relationships. A second aspect of the invention resides in the discovery of new techniques for effectively producing films from the novel compositions.

OBJECTS

It was therefore a principal object of my invention to provide a new polyisobutylene composition which could overcome all of the above-mentioned disadvantages.

More specifically, it was an object of my invention to provide a new polyisobutylene composition capable of use in roofing materials which would be effective protection and yet remain economically competitive with existing materials in accordance with the above described criteria.

It was a further object of my invention to provide a new composition of matter which could be compounded efficiently and economically and be possessed of good weathering and corrosive resistant properties.

It was still another object of my invention to provide a new polyisobuylene composition which could be used for roofing purposes and meet the requirements of a good roof as set out hereinabove.

Other objects and further scope of applicability of the present invention will become apparent from the detailed description given hereinafter.

BRIEF DESCRIPTION OF THE INVENTION

It has now been discovered that the foregoing objects may be satisfied by a new polyisobutylene composition wherein the ingredients are combined in specific relationships. It has been determined that a composition with the following general formula produces a highly effective and economical roofing material.

| | Parts by weight |
|---|---|
| A high molecular weight polyisobutylene | 100 |
| Lower polyolefin | 5–15 |
| Lubricant | 0.2–4 |
| Ultraviolet light screening agent | 20–75 |
| Inert filler | 295–400 |

GENERAL DESCRIPTION OF THE INVENTION

As stated above, the instant invention is based in part on the determination of the necessity of combining new ingredients with former additives and further in controlling all the ingredients in certain specific relationships or proportions.

Suitable polyisobutylene stocks can be formulated using saturated polymers in the molecular weight range from 80,000 to 300,000 (Staudinger) with a range of 150,000 to 250,000 being most effective and in that range 200,000 being preferred. Illustrative of the type of polyisobutylene materials operable within the scope of this invention are Oppanol B polyisobutylene and Vistanex polyisobutylene, manufactured and sold under those trademarks. Both products come in a wide range of polymers which differ from each other in their degree of polymerization and therefore molecular weight. As mentioned above, the high molecular weight product is necessary with a molecular weight of about 200,000 being preferred. If one goes below this, the resulting product becomes more fluid and no significant benefits appear to be derived if one goes above 200,000.

Carbon black dispersed in the polymer forms an effective screen against ultraviolet light degradation, and concentration, proper particle size and degree of dispersion of the carbon black in the polyisobutylene are rather influential in obtaining good weather stability. A minimum of 1 part carbon black per 100 parts of polymer is required for effective ultraviolet screening, with additional quantities of carbon black being used for reinforcement. The tensile strength of the polyisobutylene increases as the amount of carbon black is increased to 35 to 75 parts per 100 parts of polymer with 50 parts being preferred. The particle size of the carbon black also influences the long term weathering properties of the film with an average particle size of 33 millimicrons or less required to be effective. Good weathering can be obtained with material like Easy-Processing Channel or finer carbon blacks. If not thoroughly dispersed, carbon black and other fillers as well will adversely affect the weathering properties of the film.

Inasmuch as this invention also involves a white polyisobutylene stock, the ultraviolet screening agent is preferably a thorough dispersion of fine-particle-size titanium dioxide with the same proportions.

A most important feature of the invention is represented by the reduced cost effected by loading the polymer with low cost fillers or extenders. However, such extenders must be selected to exhibit good weathering stability and contribute materially to the physical properties of the polymer as a reinforcement. In addition if a white or light colored stock is desired, the extenders should be light in color and not impart an objectionable background color to the stock. It was found that a wet ground calcite, calcium carbonate, performed very satisfactorily as an extender and reinforcement for the white stock while slate dust performed very well in the black stock. Other possible extenders or fillers include mica, talc, whiting, silica, asbestos shorts, wood flour, oyster shell and similar materials.

The most satisfactory calcite had a mean particle size in the range from 2 to 5 microns. This material has high brightness and good hiding power. With regard to white stock, certain fillers or extenders can be substituted for the calcite, but greater amounts of titanium dioxide are required to obtain the high brightness observed with the water ground calcite. Good films have been prepared with extender concentrations as high as about 275 to 320 parts per 100 parts of polymer. At concentrations below 280 the tensile strength is low, the gloss mediocre and the calendering characteristics poor. A concentration of about 300 parts is preferred, giving the best strength, gloss and calendering properties. This would mean a total loading of 350 to 400 parts or more of extenders and reinforcing materials per 100 parts of polymer. This amount of loading is outside the scope of normal technology and constitutes an important aspect of the instant invention.

The actual choice of inert filler is of course dictated by economics but additionally by other factors such as its density. A given quantity of a low density material fills the stock to a greater extent than a high density material and therefore could be preferred in many instances.

Lubricants and lower polyolefins are also added to polyisobutylene to improve the processing characteristics of the stock. These ingredients are selected so they are compatible with the stock and do not "bloom" or separate from the stock and bleed to the surface. The lubricant is preferably stearic acid or a similar material such as aluminum stearate, paraffin wax, etc., which may be used in concentration from 0.2 to 4 parts per 100 parts of polymer. The selected amount of lubricant is dependent on the release effect desired during processing. These materials serve to improve the working speeds of mixtures because of increased plasticity and homogeneity through effecting better wetting of fillers and release from equipment. It has been determined that an effective amount of lubricant is about 0.5 part with any amounts over 1 part being no more effective and over 4 deleteriously affecting the gloss.

By lower polyolefin it is meant polyethylene, polypropylene or mixtures thereof. These compositions help increase the strength of the material, help with the release and impart good cold flow properties to the polyisobutylene. The selected amount used is dependent upon the melt order of the polymer inasmuch as low melt is effective in lower amounts than high melt polymers. The concentration of the lower polyolefin can be varied from 5 to 15 parts per 100 parts of the polyisobutylene polymer depending upon the physical properties desired. About 6 parts of polyethylene is preferred. It is interesting to note that the amount of lower polyolefin selected is to a large extent dependent on the amount of inert filler, e.g., calcite, selected. Six parts of polyethylene combined with about 290 to 300 parts calcite produces good tensile, gloss and stretch. If too much polythene is used, on the order of 20 parts or more, it causes the product to become spongy.

It has been established that silica such as in the form of diatomaceous earth can be added to the formulation to improve the mixing and calendering properties of the polyisobutylene stocks. Without the use of such, the composition is very difficult to calender as it is too tough. It has been used in proportions of 20 to 80 parts of silica to 100 parts of polymer. About 30 to 40 parts are preferred for lower amounts decrease the tensile and calendering properties, whereas amounts over 50 give good gloss and calendering at the expense of the tensile. However, when polythene and stearic acid concentrations are low, a silica content of about 60 parts is beneficial.

A small amount of antioxidant is added to the stock to prevent thermal oxidation during the mixing cycle. Polymer breakdown or chain breakdown can be retarded during high shear mixing if a small amount of an aromatic amine or phenol is present. It has been found that about ¼ to ½ part of antioxidant will effectively stabilize 100 parts of polymer.

The product described in this invention is comprised of a high molecular weight polyisobutylene which has been highly extended with inert fillers. In spite of the high loading, this material has excellent weathering properties and adequate physical properties for handling and application purposes. This stock can be prepared on conventional rubber processing equipment and is preferably mixed in a high intensity mixer like a Banbury. This material also can be sheeted from a plastic extruder.

It has been discovered that the mixing conditions greatly affect the physical properties of the stock. The polymer should be premasticated for a short time (60 sec.) in a warm mixer (220–250° F.) before adding the balance of the ingredients. Total mixing time should be the minimum required to insure thorough dispersion of the fillers and is usually about 5 min. Additionally, the use of a preheated mixer is of considerable benefit as it prevents the polymer from breaking down.

A more complete understanding of the invention may be obtained by reference to the following examples of operations within the scope of this invention. In these examples all parts and percentages are by weight unless otherwise indicated.

*Example I*

A composition having the following formula:

| | Parts | Percent |
| --- | --- | --- |
| Vistanex L-200 (a high molecular weight polyisobutylene on the order of 200,000) | 100 | 19.34 |
| Stearic Acid | 2 | 0.39 |
| Polyethylene DYLT (M̄W12,000, melt index 1.2-5.0 grams/10 min. at 190° C.) | 10 | 1.93 |
| EPC Black (Carbon Black) | 50 | 9.67 |
| #50 Blue Black Slate Dust | 275 | 53.22 |
| Super Floss (a calcined diatomaceous silica) | 80 | 15.40 |
| Neozone D (Phenyl-beta-naphthylamine), antioxidant | 0.25 | 0.05 | was prepared as follows: It was discovered that the stock should be preheated to at least about 200° F., and preferably by preheating the mixer. The temperature of the ingredients can be as high as 375° F. during the mixing and mastication. The batch quantity of polyisobutylene, polyethylene, stearic acid and antioxidant were added to the mixer and masticated for approximately one minute at low speed. Approximately ⅔ of the balance of the raw materials was added and the ram brought down with 40 p.s.i. pressure. The composition was mixed for two minutes. The balance of the raw material was added and the mixing continued for an additional two minutes. At the end of the mixing cycle, the batch was dumped onto a rubber mill and the stock taken off as a slab.

Accelerated tests indicated that this extended polyisobutylene film formulation had excellent weathering resistance. The film was tested in combination with several different supporting materials applied by various techniques.

Preliminary extrusion experiments were conducted on this polyisobutylene stock using a standard rubber extruder and demonstrated that the extended polyisobutylene stock lent itself readily to extrusion.

A solvent solution of the extended polyisobutylene was also prepared. Various solvents and concentrations of extended polymer were investigated. The solvent system was balanced to yield uniform films of the coating without the formation of blisters. The drying rate of the solution should be slow enough to permit unhurried application and yet permit the film to become tack-free within a reasonable time, i.e., ½ to 2 hours depending upon temperature, humidity, etc. The viscosity was adjusted to permit easy application with a hand paint roller. The following example is illustrative of the solvent solution.

*Example II*

The exended polyisobutylene stock was prepared in accordance with Example I. The stock was slabbed off of a rubber mill and cut into strips. The strips were passed through a pelletizer which reduced the stock for more rapid solution. The pellets were added to the solvent and solution was effected by tumbling or rolling the container.

The composition had the following formula:

| | Percent |
| --- | --- |
| Extended polyisobutylene stock (from Example I) | 35 |
| Naphtha | 65 |

On the basis of a random screening, physical tests of a white stock were conducted varying the whiting, stearic acid, polyethylene and diatomaceous earth at different levels, the polyisobutylene and titanium dioxide being held constant at 100 and 27.5 parts, respectively. Films calendered from these stocks were tested for tensile strength, elongation and gloss. Films with tensile strengths up to 1450 p.s.i. and 395 percent elongation were obtained. One of these films had a brightness or reflectivity value as high as 95 percent. Several formulations exhibited high surface gloss characteristics. These data and formulations are set out in Table 1 below. The physical properties as discussed herein were determined in accordance with standard A.S.T.M. specifications; hardness, D676-59; specific gravity, D1817-61T; and tensile and elongation, D412-61T.

It was evident from the data that all of the desirable characteristics for a film could not be realized from any one formulation, but as explained above, certain conclusions were reached regarding the specific amounts and relations of the various ingredients.

On the basis of calendering characteristics, brightness and gloss, two white polyisobutylene stocks were selected for weathering and performance tests. The formulas and procedure for these white films are given below in Examples III and IV. The physical properties of these unsupported films are given in Table 1, with the tensile, stretch and gloss being listed in that order for each sample.

TABLE 1.—CALCITE 280

| Polyethylene | Stearic Acid | Diatomaceous Silica | | |
|---|---|---|---|---|
| | | 30 | 40 | 50 |
| 8 | 1 | 982<br>543<br>9 | 639<br>522<br>25.5 | 603<br>474<br>17 |
| | 2 | | 515<br>469<br>17.5 | |
| | 3 | | | 665<br>420<br>13.5 |
| 10 | 1 | | 1,168<br>470<br>11 | |
| | 2 | | | 11.5 |
| | 3 | 699<br>488<br>9.5 | | |
| 12 | 1 | | | 1,046<br>508<br>30 |
| | 2 | 881<br>428<br>11 | | |
| | 3 | | 854<br>488<br>10 | |

CALCITE 290

| Polyethylene | Stearic Acid | Diatomaceous Silica | | | |
|---|---|---|---|---|---|
| | | 20 | 30 | 40 | 50 |
| 6 | ½ | 650<br>325<br>23.5 | 1,293<br>442<br>31.5 | | |
| | 2 | 653<br>470<br>10 | | | |
| 8 | 1 | | 866<br>495<br>23.5 | | 832<br>550<br>20 |
| | 2 | | 820<br>535<br>7 | 968<br>487<br>12 | 991<br>508<br>9 |
| | 3 | | | 1,015<br>510<br>13 | |
| 10 | 1 | | | 15 | |
| | 2 | | | 8 | |
| | 3 | | | | 830<br>500<br>14 |
| 12 | ½ | | | | 1,253<br>425<br>25 |
| | 1 | | | 720<br>433<br>30.5 | |
| | 2 | | | | 1,165<br>444<br>15 |
| | 3 | | 1,016<br>508<br>13.5 | | |

TABLE 1—Continued

CALCITE 300

| Polyethylene | Stearic Acid | Diatomaceous Silica | | | |
|---|---|---|---|---|---|
| | | 20 | 30 | 40 | 50 |
| 6 | 1 | | 884<br>375<br>17.5 | | |
| 8 | 1 | | 432<br>420<br>26 | 927<br>533<br>23 | |
| | 2 | | 811<br>588<br>15 | | 1,112<br>510<br>15.5 |
| | 3 | | 695<br>534<br>15 | | |
| 10 | 1 | | | | 23 |
| | 2 | | 1,088<br>442<br>11.5 | | |
| | 3 | | | 1,008<br>518<br>13 | |
| 12 | ½ | | | | 830<br>380<br>35 |
| | 1 | 1,450<br>395<br>15 | 1,263<br>440<br>11.5 | | |
| | 2 | | 1,413<br>382<br>15 | 1,128<br>434<br>17.5 | |
| | 3 | | | | 981<br>472<br>17.5 |

CALCITE 310

| Polyethylene | Stearic Acid | Diatomaceous Silica | | | | |
|---|---|---|---|---|---|---|
| | | 20 | 30 | 40 | 50 | 60 |
| 6 | ½ | 643<br>546<br>35 | | | | |
| | 1 | | | 640<br>532 | | 533<br>536<br>44.5 |
| | 2 | | | 11 | | |
| 12 | ½ | 634<br>446<br>28.5 | | | | 357<br>437<br>43.5 |
| | 1 | | | | 1,328<br>418<br>23.5 | |
| 14 | 1 | | 1,071<br>492<br>23.5 | | | 1,117<br>468<br>14 |
| | 2 | | 10.5 | | | |

*Examples III and IV*

Compositions having the following formula:

| Formula | III | | IV | |
|---|---|---|---|---|
| | Parts | Percent | Parts | Percent |
| High molecular weight polyisobutylene | 100 | 20.40 | 100 | 22.01 |
| Polyethylene | 12 | 2.45 | 6 | 1.32 |
| Stearic Acid | 0.5 | 0.10 | 0.5 | 0.11 |
| Antioxidant | 0.25 | 0.05 | 0.25 | 0.06 |
| Diatomaceous Silica | 50 | 10.20 | 30 | 6.60 |
| Titanium Dioxide | 27.5 | 5.61 | 27.5 | 6.05 |
| Calcite | 300 | 61.19 | 290 | 63.85 | were prepared in the same manner as set out in Example I.

Samples of both laminated films were prepared for exterior weathering tests. The experimental roofing membranes were applied to normally-cured 4' x 8' asbestos-cement sheets of ¼" thickness assembled in a conventional manner to simulate a roof construction. One set was applied with hot-mopped asphalt (190° F. M.P.) and the other was applied with a pourable black polyisobutylene cement. The initial values for the reflectance and gloss of the white roofing membranes are given below in Table 2.

TABLE 2.—CHARACTERISTICS OF EXPERIMENTAL WHITE POLYISOBUTYLENE FILMS

| Example | III | IV |
|---|---|---|
| 300% Modulus, p.s.i.: | | |
| Machine direction | 464 | 413 |
| Cross-machine direction | 192 | 156 |
| Modulus at Rupture, p.s.i.: | | |
| Machine direction | 830 | 1,293 |
| Cross-machine direction | 370 | 632 |
| Elongation, percent: | | |
| Machine direction | 380 | 442 |
| Cross-machine direction | 428 | 626 |
| Specific Gravity | 1.86 | 1.87 |
| Hardness, Shore A2 | 77–80 | 69–71 |

REFLECTANCE AND 85° GLOSS OF EXPERIMENTAL WHITE POLYISOBUTYLENE ROOFING MEMBRANES

| Reflectance,[1] percent: | | |
|---|---|---|
| Asphalt Bonded Membrane | 83.3 | 93.38 |
| Bonded with Cement | 82.9 | 93.86 |
| 85° Gloss:[2] | | |
| Asphalt Bonded Membrane | 45 | 51 |
| Bonded with Cement | 52.5 | 46 |

[1] Reflectance measured as percentage of Standard, Y=0.8670.
[2] 85° Gloss determined by Method Specification 611.5 TT-P 14 Ib Gloss Standard No. GBO-156 Black Glass (N=1.567)=100; value=32.

It is believed the above provides a complete description of the invention in such manner as to distinguish it from other inventions and from what is old, and provides a description of the best mode contemplated of carrying out the invention and thereby complies with the patent statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein but only in accordance with the appended claims, when read in the light of the foregoing description.

What I claim is:

1. A composition of matter comprising in approximate parts by weight the following:

| Ingredients: | Parts |
|---|---|
| Polyisobutylene having a molecular weight between 80,000 and 300,000 Staudinger units | 100 |
| Lower polyolefin selected from the group consisting of polyethylene, polypropylene, and mixtures thereof | 5 to 15 |
| Polyisobutylene-compatible lubricant | 0.2 to 4 |
| Ultraviolet screening agent selected from the group consisting of carbon black, titanium dioxide and mixtures thereof | 20 to 75 |
| Inert filler | 295 to 400 |

2. A composition of matter as claimed in claim 1 wherein the lubricant is stearic acid.

3. A composition of matter as claimed in claim 2 wherein the stearic acid is used in an amount of about 0.5 part.

4. A composition of matter as claimed in claim 1 wherein the ultraviolet light screening agent is titanium dioxide.

5. A composition of matter as claimed in claim 4 wherein the inert filler contains at least about 20 parts silica and the remainder of the filler is calcium carbonate.

6. A compostion of matter as claimed in claim 1 wherein the inert filler contains between about 20 to 80 parts diatomaceous silica and about 280 to 320 parts calcium carbonate.

7. A composition of matter as claimed in claim 1 wherein the ultraviolet light screening agent is carbon black.

8. A composition of matter as claimed in claim 7 wherein the inert filler contains at least about 20 parts silica and the remainder of the filler is slate dust.

9. A composition of matter as claimed in claim 8 wherein the polyisobutylene has a molecular weight of about 200,000.

10. A composition of matter comprising in approximate parts by weight the following ingredients:

| Ingredient: | Parts |
|---|---|
| A polyisobutylene having a molecular weight of about 150,000 to 250,000 | 100 |
| Polyethylene | 5–15 |
| Stearic acid | 0.2–4 |
| Titanium dioxide | 20–75 |
| Diatomaceous silica | 20–80 |
| Calcium carbonate | 280–320 |

11. A composition of matter comprising in approximate parts by weight the following ingredients:

| Ingredient: | Parts |
|---|---|
| A polyisobutylene having a molecular weight of about 150,000 to 250,000 | 100 |
| Polyethylene | 5–15 |
| Stearic acid | 0.2–4 |
| Carbon black | 20–80 |
| Silica | 20–80 |
| Slate dust | 280–320 |

12. The composition of claim 1 in the form of a film.

13. The composition of claim 10 in the form of a film.

14. The composition of claim 11 in the form of a film.

15. A composition of matter in approximate parts by weight of the following ingredients:

| Ingredient: | Parts |
|---|---|
| A polyisobutylene having a molecular weight of about 200,000 | 100 |
| Polyethylene | 6 |
| Stearic acid | 0.5 |
| Titanium dioxide | 27.5 |
| Silica | 30–50 |
| Calcium carbonate | 290–300 |

16. A composition of matter in approximate parts by weight of the following ingredients:

| Ingredient: | Parts |
|---|---|
| A polyisobutylene with a molecular weight of about 200,000 | 100 |
| Polyethylene | 6 |
| Stearic acid | 0.5 |
| Carbon black | 50 |
| Silica | 80 |
| Slate dust | 275 |

17. A composition of matter in approximate parts by weight of the following ingredients:

| Ingredient: | Parts |
|---|---|
| Polyisobutylene with a molecular weight of about 200,000 | 100 |
| Polyethylene | 10 |
| Stearic acid | 2 |
| Carbon black | 50 |
| Slate dust | 275 |
| Diatomaceous silica | 80 |
| Antioxidant | .25 |

18. The composition of claim 17 in the form of a film.

19. A composition of matter in approximate parts by weight of the following ingredients:

| Ingredient: | Parts |
|---|---|
| High molecular weight polyisobutylene | 100 |
| Polyethylene | 12 |
| Stearic acid | 0.5 |
| Antioxidant | 0.25 |
| Diatomaceous silica | 50 |
| Titanium dioxide | 27.5 |
| Calcite | 300 |

20. A composition of matter in approximate parts by weight of the following ingredients:

| Ingredient: | Parts |
|---|---|
| High molecular weight polyisobutylene | 100 |
| Polyethylene | 6 |
| Stearic acid | 0.5 |
| Antioxidant | 0.25 |
| Diatomaceous silica | 30 |
| Titanium dioxide | 27.5 |
| Calcite | 290 |

21. A method of preparing the composition of claim 1, comprising introducing a portion of the materials into a mixer preheated to about 220° F., mixing for a short time, adding the remaining portion of the materials and further mixing to produce a completely mixed rubbery composition.

References Cited by the Examiner

UNITED STATES PATENTS

| | | | |
|---|---|---|---|
| 2,316,706 | 4/1943 | Mueller-Cunradi et al. | 260—41 |
| 2,339,958 | 1/1944 | Sparks | 260—897 |
| 2,431,303 | 11/1947 | Billmeyer | 260—41 |
| 2,454,283 | 11/1948 | King | 260—41 |
| 2,484,060 | 10/1949 | Wing | 260—41 |
| 2,528,506 | 11/1950 | Foye | 260—41 |
| 2,529,260 | 11/1950 | Powers | 260—41 |
| 2,569,541 | 10/1951 | Selby | 260—23 |
| 2,718,473 | 9/1955 | Powers | 260—41 |
| 2,752,315 | 6/1956 | Kuettel | 260—41 |
| 2,827,192 | 3/1958 | Warth | 260—23 |
| 2,917,485 | 12/1959 | Newberg et al. | 260—23 |
| 2,952,656 | 9/1960 | Zomlefer | 260—41 |

FOREIGN PATENTS 811,842   4/1959   Great Britain.

OTHER REFERENCES

Raff et al.: "Polyethylene" (1956), pp. 401 and 402.

LEON J. BERCOVITZ, *Primary Examiner.*

DONALD E. CZAJA, *Examiner.*

E. J. TROJNAR, R. A. WHITE, *Assistant Examiners.*

UNITED STATES PATENT OFFICE
CERTIFICATE OF CORRECTION

Patent No. 3,278,471

October 11, 1966

Charles T. Rairdon

It is hereby certified that error appears in the above numbered patent requiring correction and that the said Letters Patent should read as corrected below.

Column 10, line 29, for "Carbon black--------20-80" read -- Carbon black--------35-75 --.

Signed and sealed this 5th day of September 1967.

(SEAL)
Attest:

ERNEST W. SWIDER
Attesting Officer

EDWARD J. BRENNER
Commissioner of Patents